(12) United States Patent
Bykovskyi et al.

(10) Patent No.: US 12,195,093 B2
(45) Date of Patent: *Jan. 14, 2025

(54) RACEWAY FOR COMMERCIAL CARGO BODY

(71) Applicant: STI Holdings, Inc., Stoughton, WI (US)

(72) Inventors: Denys Bykovskyi, Madison, WI (US); Gary L. Fenton, Edgerton, WI (US)

(73) Assignee: STI Holdings, Inc., Stoughton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,587

(22) Filed: Dec. 6, 2023

(65) Prior Publication Data
US 2024/0101197 A1    Mar. 28, 2024

Related U.S. Application Data

(63) Continuation of application No. 17/329,872, filed on May 25, 2021, now Pat. No. 11,884,333.

(51) Int. Cl.
| | |
|---|---|
| *B62D 25/20* | (2006.01) |
| *B62D 21/17* | (2006.01) |
| *B62D 33/04* | (2006.01) |
| *H02G 3/04* | (2006.01) |

(52) U.S. Cl.
CPC ......... *B62D 25/2054* (2013.01); *B62D 21/17* (2013.01); *B62D 33/046* (2013.01); *H02G 3/0437* (2013.01)

(58) Field of Classification Search
CPC .. B62D 25/2054; B62D 21/17; B62D 33/044; B62D 33/046; B60R 16/0215; H02G 3/0437; H02G 3/0418
See application file for complete search history.

(56) References Cited

U.S. PATENT DOCUMENTS

| | | | |
|---|---|---|---|
| 3,078,116 A | | 2/1963 | West |
| 3,333,552 A | | 8/1967 | Reynolds et al. |
| 3,377,756 A | | 4/1968 | Polhamus |
| 3,490,388 A | * | 1/1970 | Breen .................... B61D 17/10 410/139 |
| 3,494,657 A | | 2/1970 | Tantlinger et al. |
| 3,524,477 A | | 8/1970 | Steger, Jr. |
| 3,681,883 A | | 8/1972 | Ehrlich |
| 3,818,659 A | | 6/1974 | Anderson |
| 4,562,635 A | | 1/1986 | Carter |
| 4,612,745 A | | 9/1986 | Hovde |

(Continued)

FOREIGN PATENT DOCUMENTS

GB          2622282 A  *  3/2024  ............ F16L 3/1203

*Primary Examiner* — Jason S Morrow
(74) *Attorney, Agent, or Firm* — Michael Best & Friedrich LLP (57) ABSTRACT

A utility raceway for a commercial cargo body. The utility raceway includes an interior defined between a first side, a second side, a third side opposite the first side, and a fourth side opposite the second side. The utility raceway also includes a first living hinge formed between the first side and the second side and a second living hinge formed between the second side and the third side. The second side is pivotable relative to the first side about the first living hinge and the third side is pivotable relative to the second side about the second living hinge.

16 Claims, 8 Drawing Sheets

(56) References Cited

U.S. PATENT DOCUMENTS

| | | | |
|---|---|---|---|
| 4,703,948 A | 11/1987 | Ehrlich | |
| 6,062,633 A | 5/2000 | Serizawa | |
| 6,270,150 B1 | 8/2001 | Miller et al. | |
| 6,498,297 B2* | 12/2002 | Samhammer | H02G 3/0487 174/101 |
| 7,021,012 B2* | 4/2006 | Zeng | E04F 15/06 52/592.1 |
| 8,342,211 B2* | 1/2013 | King | H02G 9/025 104/275 |
| 8,668,253 B2* | 3/2014 | Bauer | B60R 16/0215 296/199 |
| 9,434,421 B1* | 9/2016 | Lu | B62D 29/02 |
| 10,000,242 B2 | 6/2018 | Jaworski et al. | |
| 11,358,652 B2* | 6/2022 | Storz | B62D 33/04 |
| 11,469,578 B1* | 10/2022 | Hu | H02G 3/0437 |
| 11,489,320 B1* | 11/2022 | Baldwin | E04H 6/188 |
| 11,505,262 B2* | 11/2022 | Reardon | B62D 27/026 |
| 11,548,566 B2* | 1/2023 | Sagarsee | B62D 25/2054 |
| 11,884,333 B2 | 1/2024 | Bykovskyi et al. | |
| 11,973,330 B1* | 4/2024 | Wellens | H02G 9/04 |
| 2007/0126262 A1 | 6/2007 | Baker et al. | |
| 2015/0076861 A1 | 3/2015 | Padmanabhan | |
| 2023/0208117 A1* | 6/2023 | Kim | H02G 3/0431 174/68.3 |
| 2023/0246431 A1* | 8/2023 | Gintz | H02G 3/0418 248/542 |

\* cited by examiner

RACEWAY FOR COMMERCIAL CARGO BODY

RELATED APPLICATIONS

This application is a continuation of U.S. application Ser. No. 17/329,872, filed May 25, 2021, the entire contents of which are hereby incorporated by reference.

BACKGROUND

The present invention relates to cargo bodies, and in particular, the placement of utility (e.g., electrical, air, hydraulic, fuel, etc.) lines therein.

Commercial cargo bodies or trailers transported by trucks or other vehicles include a set of walls that enclose an interior space of the trailer. Typically, the interior space is defined, on a bottom side, by a plurality of floorboards running a longitudinal direction of the trailer. Raceways are used in conjunction with the floorboards to run electrical and other lines through the trailer. The raceways protect the lines from the environment surrounding the bottom side of the trailer.

SUMMARY

In one independent aspect, the invention provides a utility raceway for a commercial cargo body. The utility raceway includes an interior defined between a first side, a second side, a third side opposite the first side, and a fourth side opposite the second side. The utility raceway also includes a plurality of internal utility cavities separated by at least one vertically-oriented flange extending between the first and third sides, a first living hinge formed between the first side and the second side, and a second living hinge formed between the second side and the third side. The first side is pivotable relative to the second side about the first living hinge and the third side is pivotable relative to the second side about the second living hinge.

In another independent aspect, the invention provides a floor assembly for a commercial cargo body. The floor assembly includes a first utility raceway, a second utility raceway spaced from the first utility raceway such that the first and second utility raceways define a spacing distance therebetween, and a set of floor planks configured to span the spacing distance and, in cooperation with the first and second utility raceways, define a load floor of the commercial cargo body. Each of the first and second utility raceways is operable to open and close to provide access to respective interior utility cavities when the floor assembly is in a fully constructed state with the set of floor planks in place. The set of floor planks consists entirely of interchangeable planks.

Other aspects of the disclosure will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. It should be understood that the description of specific embodiments is not intended to limit the disclosure from covering all modifications, equivalents, and alternatives falling within the spirit and scope of the disclosure. Also, it is to be understood that the phraseology and terminology used herein is for the purpose of description and should not be regarded as limiting.

The term "laterally" or variations thereof refer to a sideways direction. The terms "top," "upper," "bottom," and "lower" are intended to indicate directions when viewing the commercial cargo body when positioned for use. The term "coupled" means connected to or engage with, either directly or indirectly, for example with an intervening member, and does not require the engagement to be fixed or permanent, although engagement can be fixed or permanent. It should be understood that the use of numerical terms "first," "second," "third," etc. as used herein does not refer to any particular sequence or order of components; for example, "first" and "second" portions may refer to any sequence of such components, and is not limited to the first and second components of a particular configuration.

Figure 1:
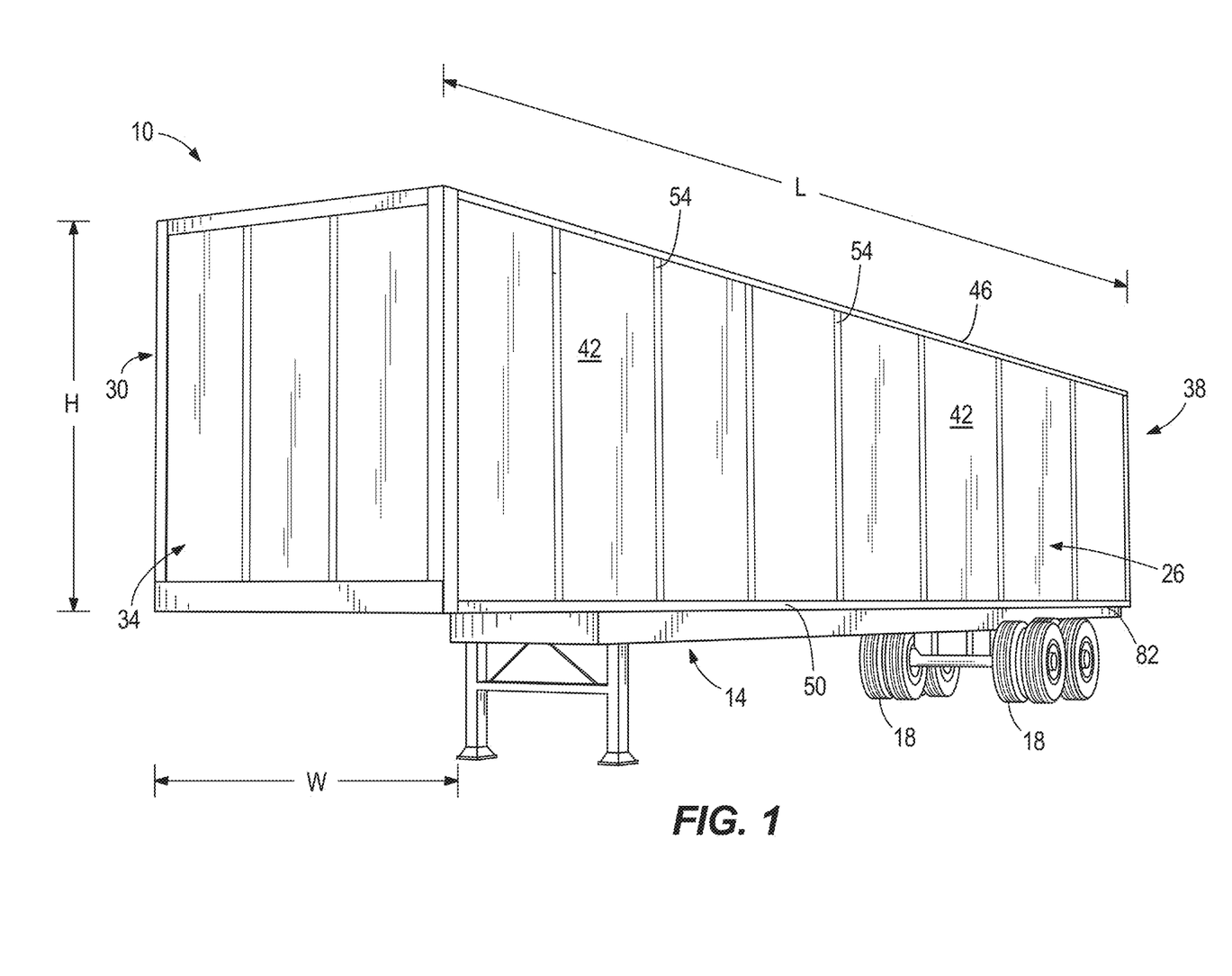
FIG. 1 is a first perspective view of a commercial cargo body.
Figure 2:
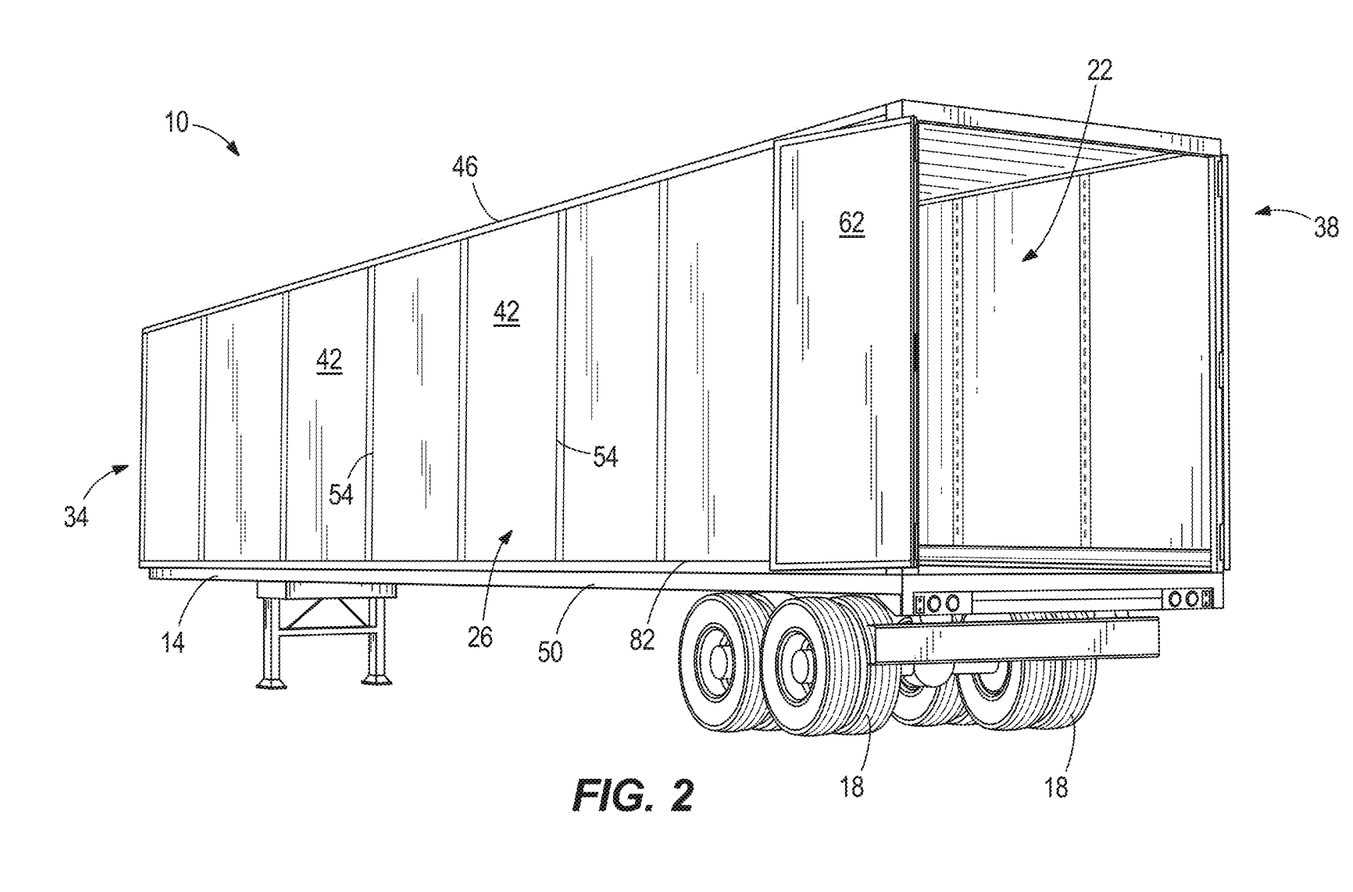
FIG. 2 is a second perspective view of the commercial cargo body of FIG. 1.

FIGS. 1 and 2 illustrate a commercial cargo body, embodied here as a trailer 10 for over-the-road use with a truck to transport large cargo volumes. In other embodiments, the commercial cargo body may be a straight truck, or the like. As shown, the trailer 10 is a semi-trailer configured for use with a road tractor (i.e., in forming a so called 18-wheeler). Aspects of the invention are not necessarily limited to such a trailer 10, and aspects of the disclosure will be understood as also applying to other trailers and commercial cargo bodies of various configurations. The trailer 10 includes a chassis 14 having axles with multiple sets of wheels 18, although similar commercial cargo bodies may be provided with alternate rolling chassis configurations or none at all. The trailer 10 defines a length L in a longitudinal or transport direction. The length L can be 53 feet in some constructions, although the trailer 10 can be manufactured in other lengths greater than or less than 53 feet. Perpendicular to the longitudinal direction, the trailer 10 defines a width W and a height H. The width W cooperates with the length L to define a plan view footprint of the trailer 10, while the height H of the trailer 10 is measured perpendicular to the footprint (i.e., perpendicular to the ground). Subtracting for wall thicknesses, the length L, the width W, and the height H cooperate to define a cargo receiving interior 22 (FIG. 2) of the trailer 10.

The trailer 10 includes a first side defined by a first side wall 26, a second side defined by a second side wall 30 opposite the first side wall 26, a front defined by a front wall 34, and a rear 38. Wall panels 42 may form walls that span the first side wall 26, second side wall 30, and front wall 34. Each of the first side wall 26, second side wall 30, and front wall 34 can be constructed of one or more wall panels 42. Further in some embodiments, a wall panel may wrap around a corner of the trailer and form parts of multiple walls (e.g., the front wall and one of the first and second side walls). All of the wall panels 42 extend between a roof 46 of the trailer 10 and a floor 50 of the trailer 10. Consecutive wall panels 42 can be joined together by a rail or spline 54 forming a joint that extends parallel to the direction of the height H of the trailer 10 between the roof 46 and floor 50 of the trailer 10. As shown in FIG. 2, the rear 38 of the trailer 10 includes at least one door panel 62 provided to selectively open for accessing the interior 22 for loading and unloading.

Figure 3:
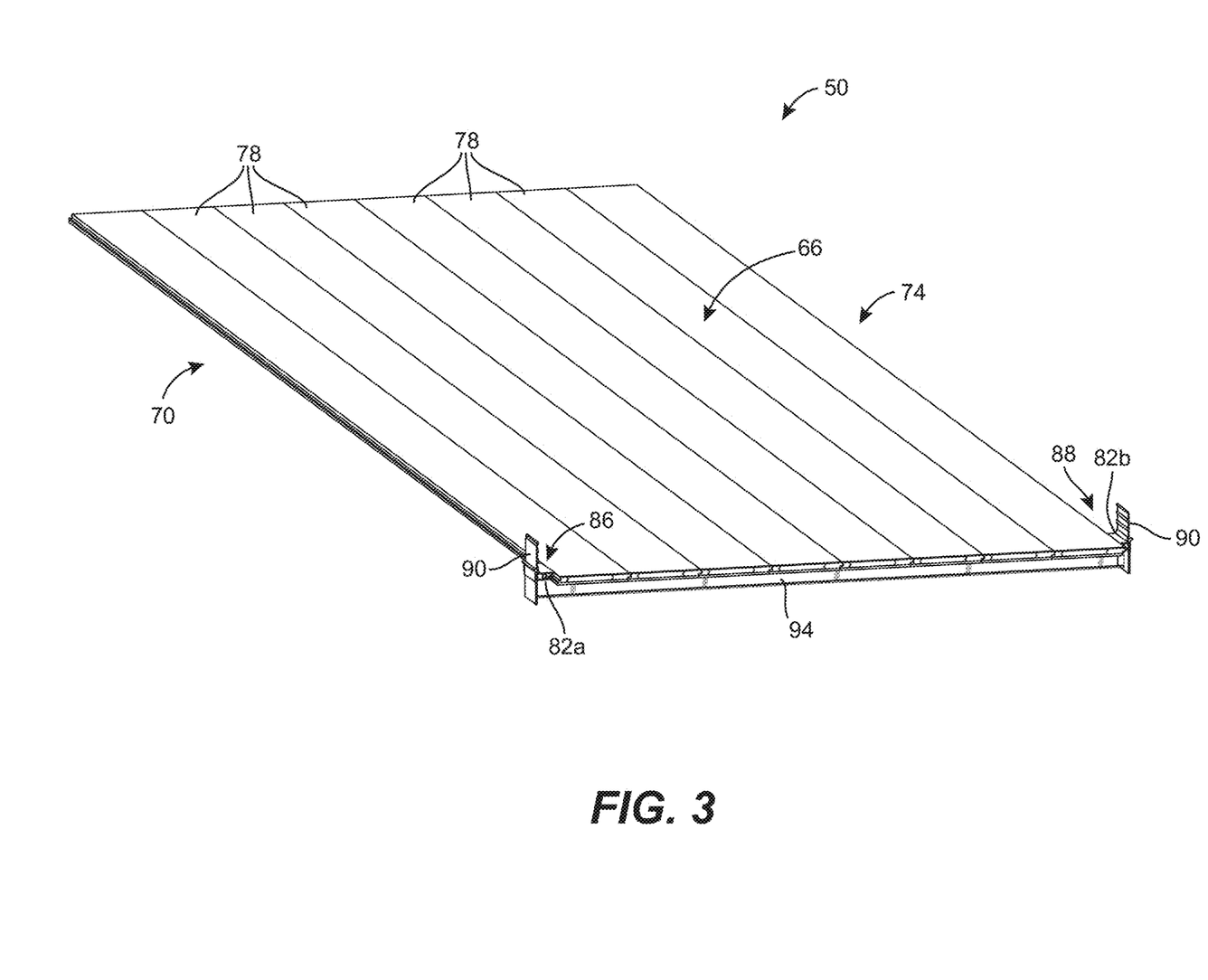
FIG. 3 is a perspective view of a portion of a floor of the commercial cargo body of FIG. 1.
Figure 4:
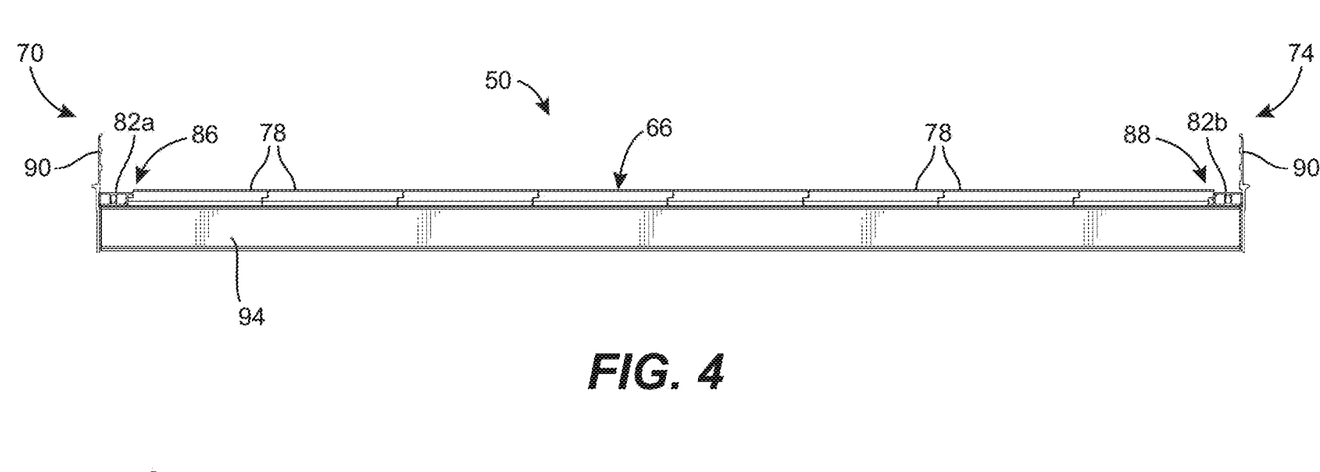
FIG. 4 is a front view of the floor of FIG. 3.
Figure 11:
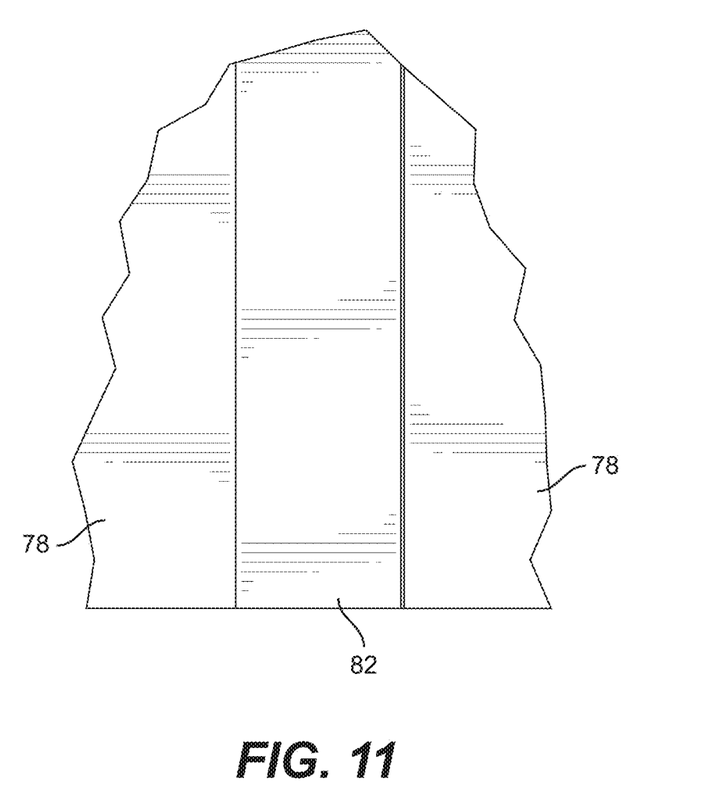
FIG. 11 is a plan view of a floor according to another embodiment of the invention.

FIGS. 3 and 4 illustrate a portion of the floor 50. The floor 50 may be defined as a load bearing floor meaning that the floor 50 is configured to support the weight of cargo transported by the trailer 10. The floor 50 defines a support surface 66 that supports the cargo and allows users to walk within the interior 22 of the trailer 10 and/or load and unload cargo with machinery such as a forklift. The floor 50 also defines a first lateral edge 70, a second lateral edge 74 opposite the first lateral edge 70, and a plurality of floor planks 78 extending between the first and second lateral edges 70, 74. The planks 78 may extend the entire length L of the trailer 10 between the front wall 34 and the rear of 38 of the trailer 10. The floor may also include multiple rows of planks 78 between the front wall 34 and the rear 38 of the trailer 10. The floor 50 also includes a plurality of raceways 82. In the illustrated embodiment, the floor 50 includes a first utility raceway 82a adjacent the first lateral edge 70 and a second utility raceway 82b adjacent the second lateral edge 74. In other embodiments, the floor 50 may include more than two raceways between the first and second lateral edges 70, 74. The first and second raceways 82a, 82b are disposed in a space 86 defined between outer most planks 78 and rails 90. The rails 90 support the wall panels 42 on an exterior of the trailer 10. In other embodiments, such as the embodiment shown in FIG. 11, the floor 50 may include raceways 82 between planks 78. As such, the raceways 82 need not be disposed between the outer most planks 78 and the rails 90.

The chassis 14 includes a plurality of cross-beams 94 that support the planks 78 and the raceways 82a, 82b. The cross-beams 94 extend the width W of the trailer 10 between the first and second sides of the trailer 10. Although only one cross-beam 94 is illustrated, the trailer 10 may include a plurality of cross-beams 94 that are intermittently spaced apart along the length L of the trailer 10. In other embodiments, the cross-beams 94 may be omitted, for example, if a platen floor structure were used instead of cross-beams and planks. One example of a platen floor can be found in U.S. Publication No. 2017/0057561, the entire contents of which are incorporated by reference herein. The raceways 82a, 82b and the planks 78 may be coupled to the cross-beams 94 with fasteners, such as floor screws.

In the illustrated embodiment, eight floor planks 78 extend between the first and second lateral edges 70, 74 of the floor 50. In other embodiments, the floor 50 may include more than eight or less than eight planks 78 extending between the first and second lateral edges 70, 74 of the floor 50. Generally, each one of the plurality of floor planks 78 is identical to the other planks 78 of the plurality of planks 78. In other words, the floor planks 78 are interchangeable with each other such that any given floor plank 78 can be used in any given position. In some embodiments, the floor planks 78 may be constructed of natural or engineered wood, or a wood alternative such as a polymer resin composite material. In other embodiments, the floor planks 78 may be an aluminum extrusion. Further, the floor planks 78 may not be identical to other floor planks 78 and may be instead a mixture of different shaped floor planks 78.

Figure 5:
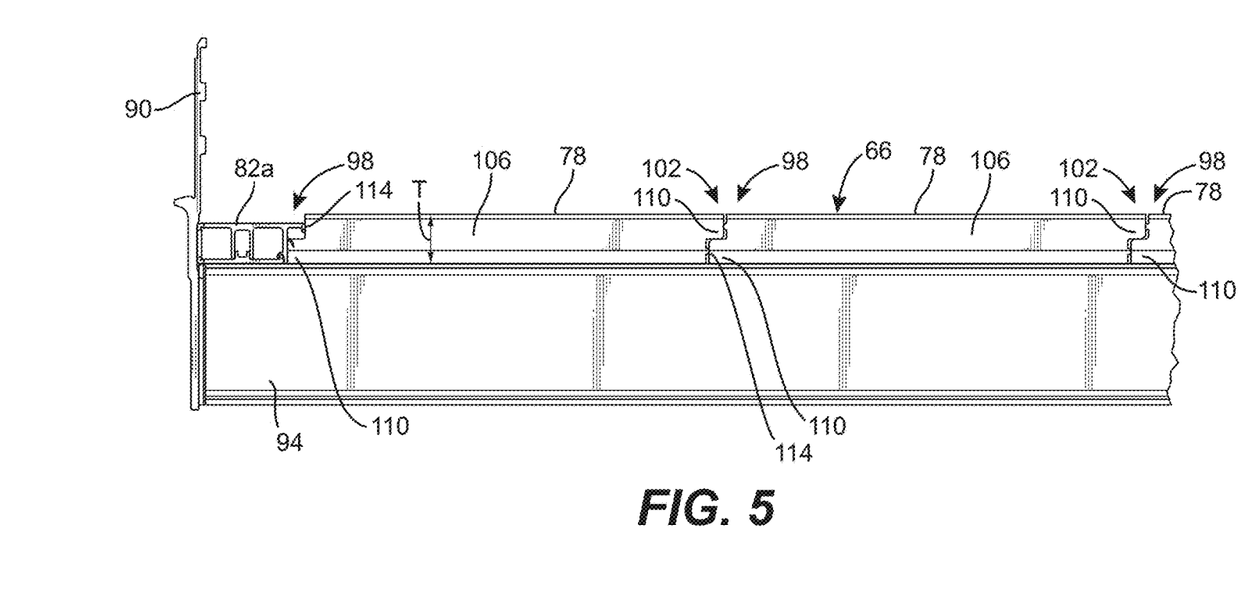
FIG. 5 is a close-up view of one side of the floor of FIG. 4.
Figure 8:
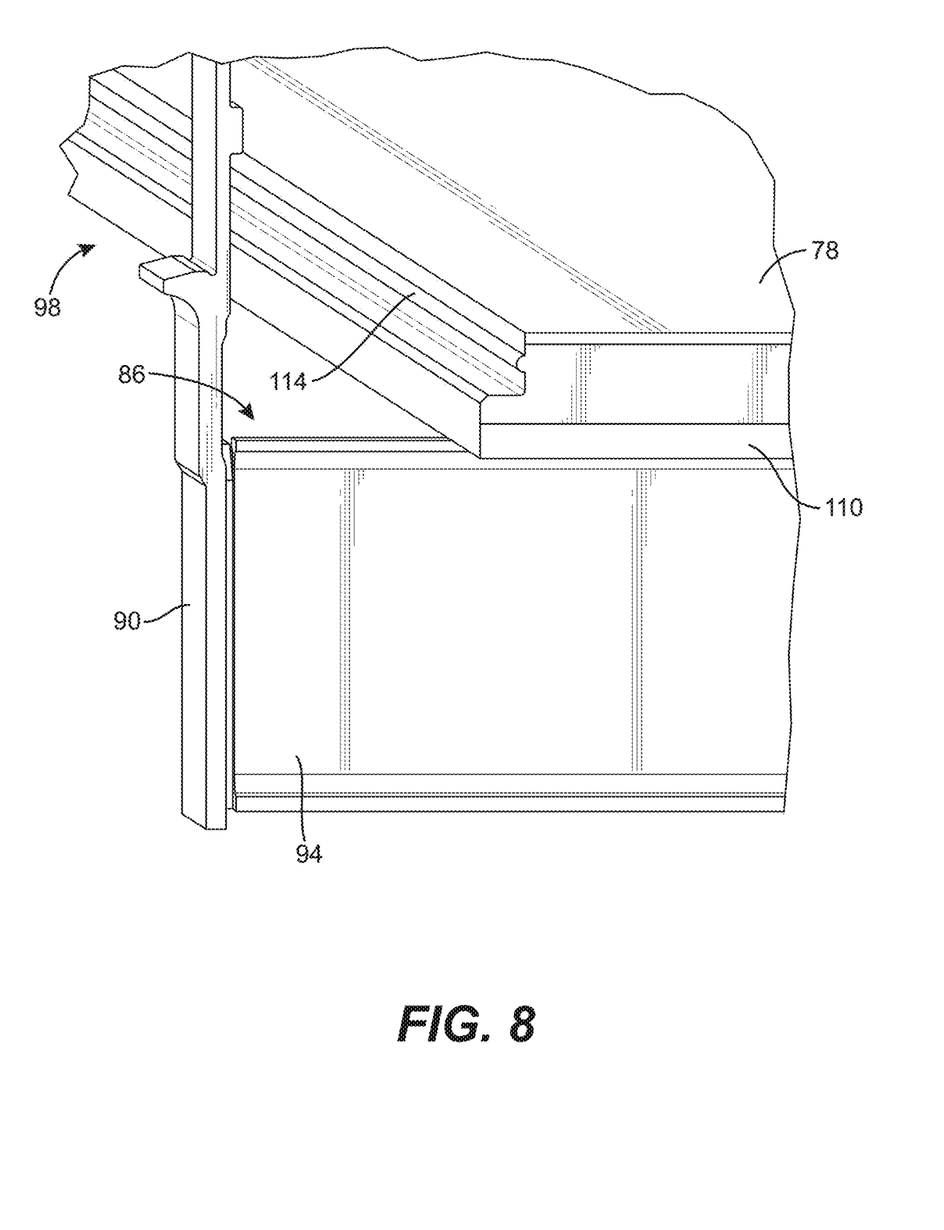
FIG. 8 is a perspective view of one side of the floor of FIG. 3 with a raceway removed.

Moving to FIG. 5, each of the floor planks 78 include a first laterally outer edge 98, a second laterally outer edge 102 opposite the first laterally outer edge 98, and a central portion or body 106 between the first and second laterally outer edges 98, 102. The first and second laterally outer edges 98, 102 define respective laps or shelves 110 that projects laterally outwardly from the body 106. For example, from the frame of reference of FIG. 5, the shelf 110 of the first laterally outer edge 98 is a lower shelf that projects to the left and the shelf 110 of the second laterally outer edge 102 is an upper shelf that projects to the right. As such, the joining of laterally adjacent planks 78 includes mating or overlapping the shelf 110 of the first laterally outer edge 98 of a first plank 78 with a shelf 110 of the second outer edge 102 of a second plank 78 in a shiplap arrangement. In other embodiments, the planks 78 may be arranged so that the shelf 110 of the first laterally outer edge 98 is an upper shelf that projects to the left and the shelf 110 of the second laterally outer edge 102 is a lower shelf that projects to the right. In further embodiments, the planks 78 may include first and second shelves that each extend from the left or right respectively that are both upper shelves or lower shelves. In such an embodiment, the planks 78 may be alternatively placed on the floor 50 having one plank with upper shelves and an adjacent plank with lower shelves that overlap the upper shelves. In other words, the planks 78 would define a T-shaped cross section which would allow the planks 78 to be flipped relative to an adjacent plank 78 to create an alternating plank pattern. Each of the planks 78 also define a thickness T. In other words, the planks 78 position the support surface 66 a distance from the cross-beams 94 that correlates to the thickness T. The thickness T may be within a range between 1 inch and 1.5 inches. In other embodiments, the thickness T may be within a range between 0.5 inch and 2 inches. Each of the floor planks 78 also includes a lateral projection 114 (FIG. 8) adjacent the shelf 110 of the first laterally outer edge 98 and a lateral projection 114 adjacent the shelf 110 of the second laterally outer edge 102. The lateral projections 114 extend parallel to and are offset from the respective shelves 110, and the lateral projections 114 may be configured as crusher beads that deform upon assembly of the floor 50.

Figure 6:
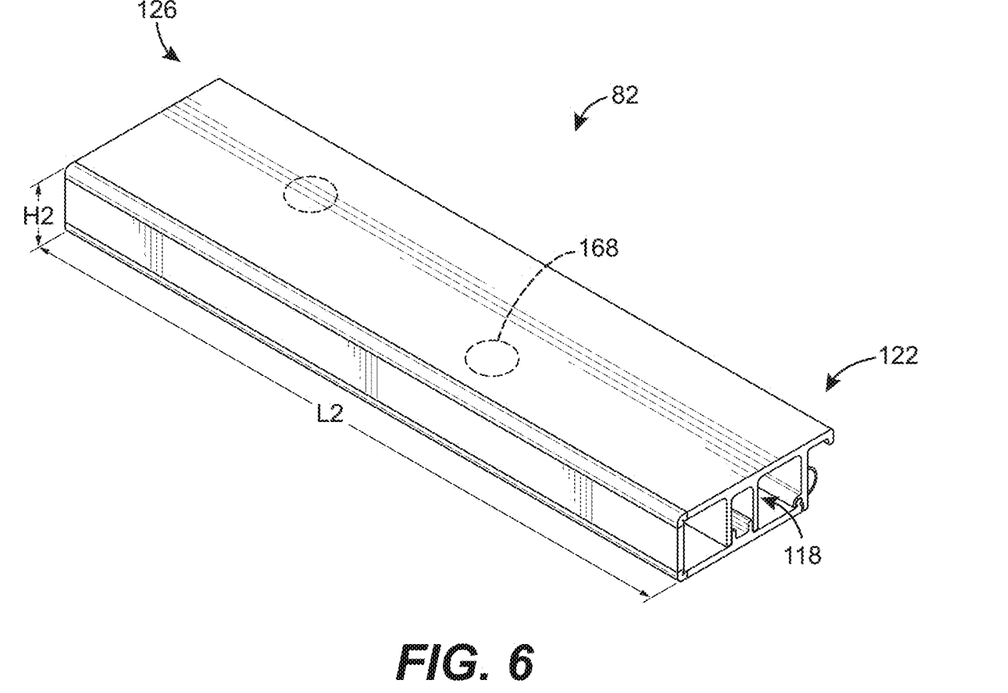
FIG. 6 is a perspective view of a raceway.
Figure 7:
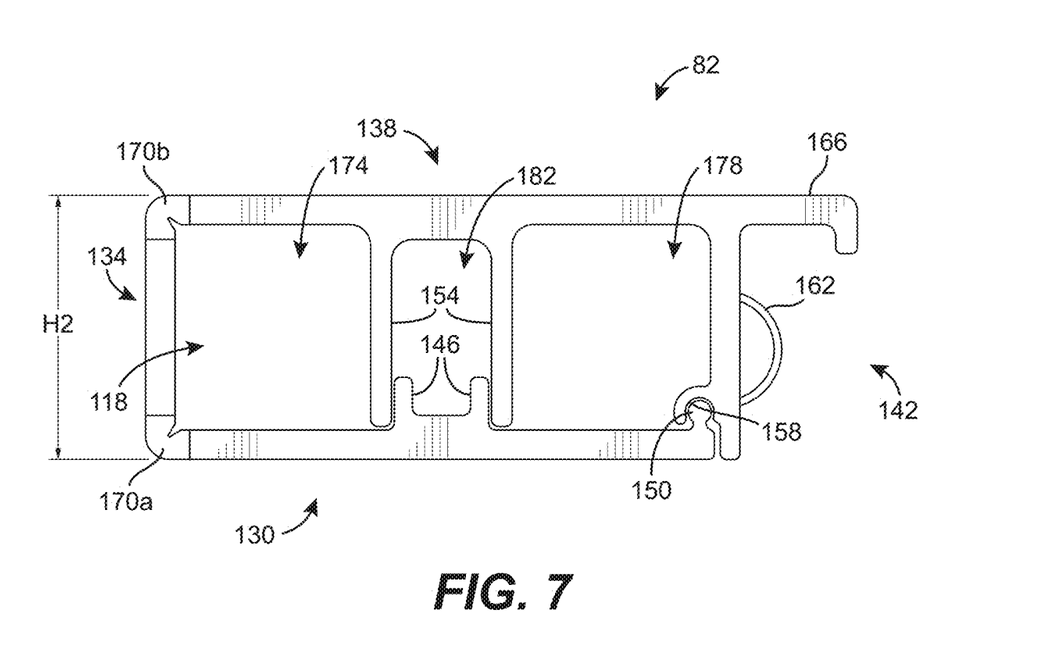
FIG. 7 is a front view of the raceway of FIG. 6.

With reference to FIGS. 6 and 7, each of the raceways 82 defines an interior 118 that stores and protects one or more utility lines 120 (FIGS. 9 and 10) for the trailer 10. For example, utility lines 120 disposed within the interior 118 of the raceways 82 may include but are not limited to electrical wiring for carrying electrical current to one or more electrical devices, pneumatic hoses for carrying pressurized air to one or more pneumatic devices, hydraulic lines for carrying pressurized oil to one or more hydraulic devices, or fuel lines to carry fuel to fuel-burning devices. As such, the raceways 82 may open to allow access to the interior 118 to install and/or inspect, repair, or modify the utility lines 120. As described in further detail below, each raceway 82 can open to and provide access from the cargo-receiving interior 22. The raceways 82 can selectively be opened to provide access from the interior 22 even after the floor 50 is fully installed. Each raceway 82 includes a first end 122, a second end 126 opposite the first end 122, and a length L2 between the first and second ends 122, 126. The length L2 may extend the full length L of the trailer. Alternatively, the length L2 of the raceways 82 may extend partially between the front wall 34 and the rear 38 of the trailer 10. In addition, the length L2 may not extend the same length as the floor planks 78 along the floor 50.

Moving to FIG. 7, the interior 118 of each raceway 82 is defined by a first side 130, a second side 134, a third side 138 opposite the first side 130, and a fourth side 142 opposite the second side 134. The sides 130-142 are generally formed orthogonally or perpendicularly to an adjacent side. As such, the overall profile of the raceway 82 is rectangular. In other embodiments, the sides 130-142 of the raceway 82 may be angled relative to an adjacent side. As such, the raceway 82 may be trapezoidal. The first side 130 includes two vertically-oriented alignment tabs 146 that project into the interior 118 of the raceway 82 and a bead 150 adjacent an end of the first side 130. The third side 138 includes two vertically-orientated load bearing columns or flanges 154 that project into the interior 118 of the raceway 82 in a direction opposite the alignment tabs 146. The load bearing flanges 154 improve the structural integrity of the raceway 82 when positioned for use. The load bearing flanges 154 are positioned on the outside of the alignment tabs 146 when the raceway 82 is in a closed configuration. In alternative constructions, the alignment tabs 146 and the load bearing flanges 154 are reversed among the first and third sides 130, 138 so that the load bearing flanges 154 extend upwardly from the first side 130 and/or are reversed so that the load bearing flanges 154 are positioned on the inside of the alignment tabs 146.

Figure 9:
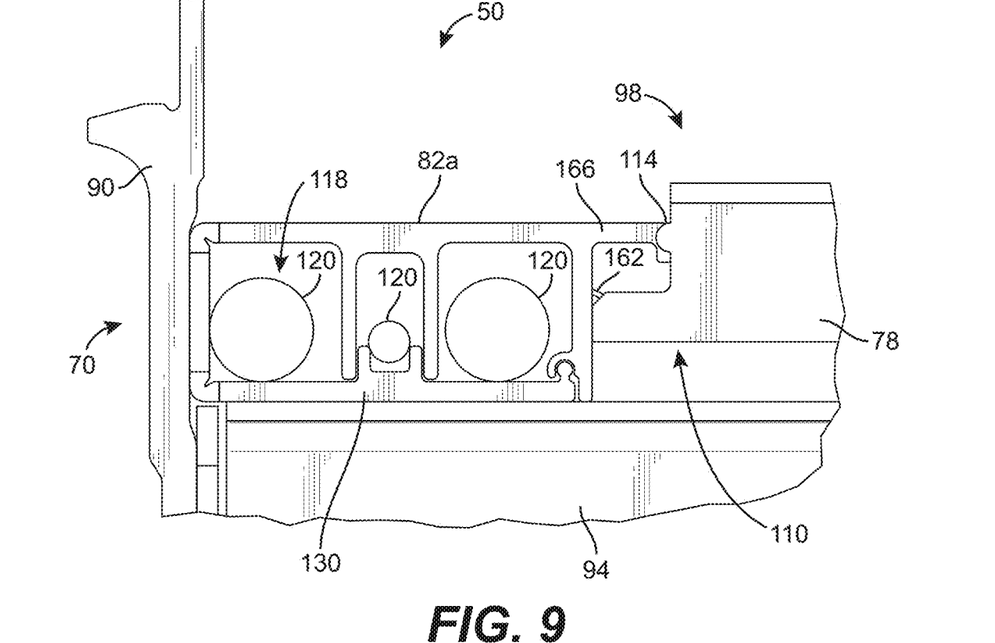
FIG. 9 is a front view of one side of the floor of FIG. 3 including a first raceway.
Figure 10:
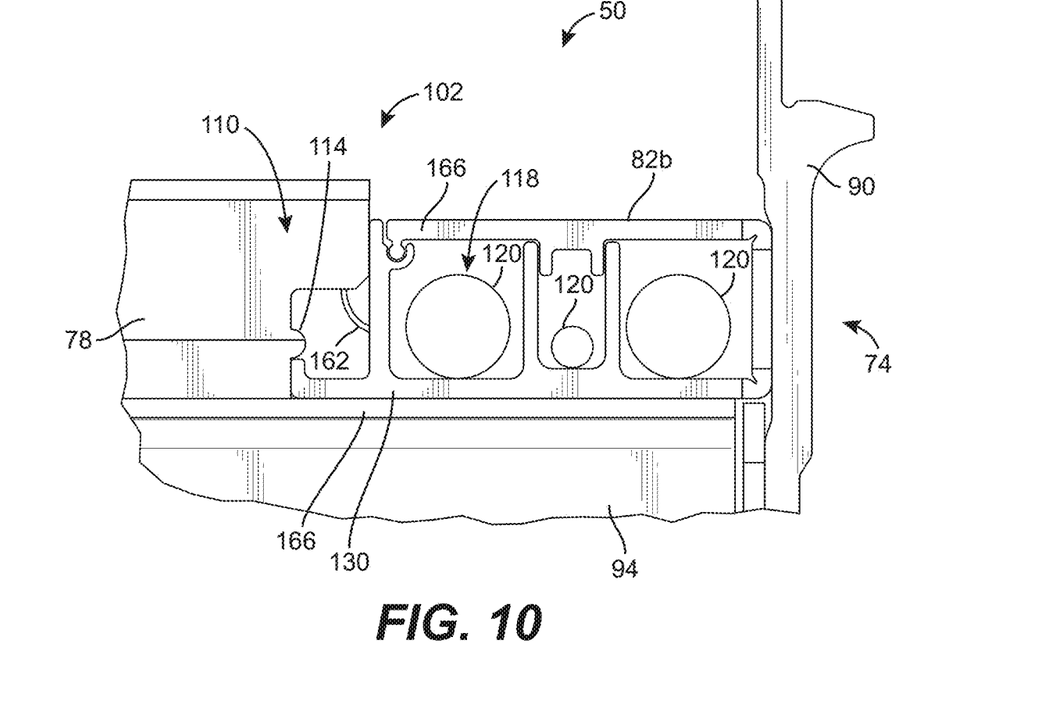
FIG. 10 is a front view of another side of the floor of FIG. 3 including a second raceway.

The fourth side 142 includes a recess 158 to receive the bead 150 of the first side 130. The bead 150 and the recess 158 may be defined as a snap-in lock, or in other words an interference fit latch, to secure the raceway 82 in the closed configuration. The lock or latch for closing the raceway 82 is integrally formed by the material of the raceway 82 (e.g., extrusion shape of the first and fourth sides 130, 142) without any extraneous parts. When closed, the raceway interior 118 may be sealed from water intrusion, the only openings to the interior 118 being located at extreme lengthwise ends. The fourth side 142 also includes an elastic member 162 or seal disposed on an exterior of the raceway 82. The elastic member 162 has a half-circle shape and creates a seal when engaged with an outer edge 98, 102 of a floor plank 78. An overhang 166 extends from the third side 138. The overhang 166 provides a handle or actuator that a user may use to gain access to the interior 118 of the raceway 82. Additionally, the overhang 166 extends to engage one of the outer edges 98, 102 of the outer most planks 78 on the floor 50. Specifically, the overhang 166 engages the projection 114 on the outer edges 98, 102 to secure the raceway 82 within the space 86 (FIGS. 9 and 10). In some embodiments, the raceways 82 may include an aperture 168 (FIG. 6) in any of the sides 130, 134, 138, 142 that allows a utility line to extend out of the interior 118 for usage elsewhere. The aperture 168 is spaced from both longitudinal ends of the raceway 82.

With continued reference to FIG. 7, a first living hinge 170a connects the first side 130 to the second side 134 and a second living hinge 170b connects the second side 134 to the third side 138. The first hinge 170a allows the second side 134 to pivot relative to the first side 130. Similarly, the second hinge 170b allows the third side 138 to pivot relative to the second side 134. Pivoting of the hinges 170a, 170b moves the raceways 82 from the closed configuration to an open configuration, in which a user has access to the interior 118 of the raceway 82. For example, a user may lift the third side 138 causing the third side 138 to pivot relative to the second side 134 about the second hinge 170b. If additional access to the interior 118 of the raceway 82 is needed, a user may further lift the third side 138 causing the second side 134 to pivot relative to the first side 130 about the first hinge 170a. In the illustrated embodiment, each raceway 82 is produced as a unitary extrusion with a single extrusion process. The raceway 82 can be formed as a multi-material extrusion such that the hinges 170a, 170b include a first hardness on the durometer scale and the rest of the raceway 82 include a second hardness on the durometer scale that is less than the first hardness. Providing the hinges 170a, 170b with a lower hardness allows the hinges 170a, 170b to be flexible and resilient without sacrificing the strength of the other parts of the raceway 82.

The raceways 82 further define a plurality of internal cavities. Specifically, each raceway 82 defines a first internal cavity 174, a second internal cavity 178, and third internal cavity 182 between the first and second internal cavities 174, 178. In other embodiments, the raceways 82 may include more than three internal cavities. The first internal cavity 174 is defined between a portion of the first side 130, the second side 134, a portion of the third side 138, and one of the load bearing flanges 154. The second internal cavity 178 is defined by a portion of the first side 130, a portion of the third side 138, the fourth side 142, and the other of the load bearing flanges 154. The third internal cavity 182 is defined by a space enclosed by the alignment tabs 146 and the load bearing flanges 154. As mentioned above, the raceways 82 are generally rectangular in cross-section, as such, the internal cavities 174, 178, 182 are generally rectangular in cross-section as well. However, in other embodiments, the internal cavities 174, 178, 182 may be circular in cross-section or include a cylindrical race cavity to receive utility lines. Different types of utility lines 120 may be disposed within the respective first, second, and third internal cavities 174, 178, 182. For example, the first internal cavity 174 may house electrical utility lines, the second internal cavity 178 may house pneumatic utility lines, and the third internal cavity 182 may house hydraulic utility lines, although any other defined layout is optional, including separation of a single type of utility lines—for example maintaining different cavities for two or more electrical lines that vary in their construction and/or usage. As such, providing a plurality of separate internal cavities allows a user to organize and arrange the utility lines 120 as desired.

The raceways 82 further define a height H2 between the first and third sides 130, 138. The height H2 may be within a range between 1 inch and 1.5 inches. In other embodiments, the height H2 may be within a range between 0.5 inch and 2 inches. In some embodiments, the height H2 of the raceway 82 may be equal to the thickness T of the floor planks 78. As such, the raceways 82 and the floor planks 78 may define a continuous floor surface. However, the height H2 of each raceway 82 can be either less than or greater than the planks 78 such that the top surface of the raceway 82 when installed is either recessed from or extended proud of the floor surface defined by the planks 78.

As illustrated in FIGS. 9 and 10, the raceways 82a, 82b may be positioned with the first side 130 supported by the cross-beams 94 (FIG. 9, trailer road side) or the raceways 82a, 82b may be positioned with the third side 138 supported by the cross-beams 94 (FIG. 10, trailer curb side). As shown in FIG. 9, the overhang 166 extends over the shelf 110 of the first laterally outer edge 98 of an outer plank 78.

A user may lift the third side 138 of the raceway 82a to gain access to the interior 118 of the raceway 82a. Conversely, as shown in FIG. 10, the overhang 116 extends under the shelf 110 of the second laterally outer edge 102 of an outer plank 78. A user may lift the first side 130 of the raceway 82b to gain access to the interior 118 of the raceway 82b. Therefore, the first and third sides 130, 138 of the raceways 82a, 82b define doors that allow access to the interiors 118 of the raceways 82a, 82b. Which of the sides 130, 138 defines the door is a function of the orientation in which the raceway is installed. In the illustrated embodiment, the floor 50 includes a raceway 82a adjacent the first lateral edge 70 with the first side 130 supported by the cross-beams 94 and a raceway 82b adjacent the second lateral edge 74 with the third side 138 supported by the cross-beams 94. As such, the raceways 82a, 82b are interchangeable between the first and second lateral edges 70, 74 of the floor 50. In other words, the second raceway 82b is positioned inversely relative to the first raceway 82a on the respective lateral edges 70, 74 of the floor 50. Providing the raceways 82a, 82b to be identical and interchangeable also allows for identical planks 78 to be used across the entire floor 50, rather than having any specialized end planks.

During installation of the floor 50 within the trailer 10, the first electrical raceway 82a is positioned adjacent the rail 90 on the first side of the trailer 10 with the first side 130 of the raceway 82a supported by the cross-beams 94. Similarly, the second electrical raceway 82b is positioned adjacent the rail 90 on the second side of the trailer 10 with the third side 138 of the raceway 82b supported by the cross-beams 94. Next, an outer most plank 78 is positioned on the cross-beams 94 adjacent the first electrical raceway 82a. The outer most plank 78 on the first lateral edge 70 of the floor 50 is then slid into engagement with the first electrical raceway 82a so that the shelf 110 of the first outer edge 98 of the plank 78 is positioned under the overhang 166. FIG. 9 illustrates that the shelf 110 can be pressed flush with the fourth side 142 of the raceway 82a, although a small gap may remain. In addition, the overhang 166 of the raceway 82a engages the projection 114 of the plank 78 above the shelf 110. As the plank 78 is slid into engagement with the fourth side 142, the elastic member 162 is deformed to create a seal between the plank 78 and the raceway 82a. With the outer most plank 78 adjacent the first electrical raceway 82a, additional planks 78 are then laid on the cross-beams 94. Each plank 78 is slid into engagement with an adjacent preceding plank 78 by sliding the plank 78 laterally until the shelf 110 of the first outer edge 98 mates with the shelf 110 of the second outer edge 102 of the adjacent plank 78. The outer most plank 78 on the second lateral edge 74 of the floor 50 (FIG. 10) is positioned last. As the last plank 78 is laid, the shelf 110 of the first outer edge 98 is slid under the shelf 110 of the second outer edge 102 of the adjacent plank 78 (not shown in FIG. 10), and the second outer edge 102 of the last plank 78 is pivoted to engage the fourth side 142 of the second raceway 82b. The projection 114 of the last plank 78 is positioned above (e.g., directly above and in contact with) the overhang 166, and the shelf 110 of the second outer edge 102 deforms the elastic member 162 to create a seal between the outer most plank 78 and the raceway 82b. It should be noted that the above installment of the floor 50 may be done in the reverse. In other words, the planks 78 may be laid in a direction starting with the second raceway 82b and ending with placing the last plank 78 adjacent the first raceway 82a. In that case, the final plank 78 is pivoted down into place after having its shelf 110 slid under the overhang 166 of the first raceway 82a.

The utility lines 120 may be placed within the interior 118 of the raceways 82a, 82b either prior to installing the floor planks 78 or after installing the floor planks 78. As described above, a user may either lift the third side 138 or the first side 130, depending on which lateral edge 70, 74 of the floor 50 the raceway is positioned, to the open configuration to gain access to the interior 118 of the respective raceway 82a, 82b. As a user lifts the access door provided by either the first or third side 130, 138 of the raceway 82a, 82b, the bead 150 disconnects from the recess 158 to effectively unlatch the door. Meanwhile, the first or third side 130, 138 pivots relative to the second side 134 about one of the hinges 170a, 170b to the open configuration. While in the open configuration, a user may place the utility lines 120 within the internal cavities 174, 178, 182 as desired. Once the utility lines 120 are organized as desired by the user, the user then pivots the door relative to the second side 134 about one of the hinges 170a, 170b until the bead 150 is received in the recess 158 to latch the door. When the bead 150 is received back within the recess 158, the interior 118 of the raceway 82a, 82b is secured in the closed configuration. If access to the utility lines 120 is later desired by a user, the user may repeat the steps described above to gain access to the interior 118 of the raceway 82a, 82b. Although described as fully installing the floor 50 and then opening the raceways 82a, 82b to install the utility lines 120, it is also conceived to place the utility lines 120 into the raceways 82a, 82b prior to installation of some or all of the planks 78. Further, the raceways 82a, 82b may be installed in their open configurations, and only latched following placement of the utility line(s) 120.

Various features and advantages are set forth in the following claims.

What is claimed is:

1. A utility raceway for a commercial cargo body, the utility raceway comprising:
    an interior defined between a first side, a second side, a third side opposite the first side, and a fourth side opposite the second side;
    a first living hinge formed between the first side and the second side; and
    a second living hinge formed between the second side and the third side;
    wherein the second side is pivotable relative to the first side about the first living hinge and the third side is pivotable relative to the second side about the second living hinge.

2. The utility raceway of claim 1, wherein the second side and the third side are pivotable relative to the first side about the respective first living hinge or second living hinge from a closed configuration, in which access to the interior is inhibited, and an open configuration, in which access to the interior is permitted.

3. The utility raceway of claim 2, wherein the fourth side includes a recess and the first side includes a bead received in the recess to secure the utility raceway in the closed configuration.

4. The utility raceway of claim 1, wherein the first and second living hinges include a first hardness on the durometer scale and the first, second, third, and fourth sides include a second hardness on the durometer scale that is greater than the first hardness.

5. The utility raceway of claim 1, wherein the first, second, third, and fourth sides and the first and second living hinges are formed as a single, multi-material extrusion.

6. The utility raceway of claim 1, wherein the first and third sides are generally orthogonal to the second and fourth sides when in a closed configuration.

7. The utility raceway of claim 1, wherein the fourth side includes an elastic member disposed on an exterior of the utility raceway.

8. The utility raceway of claim 1, further comprising an overhang extending from the third side past the fourth side.

9. A floor assembly for a commercial cargo body, the floor assembly comprising:
- a set of floor planks configured to span between first and second walls of the commercial cargo body, the set of floor planks defining a first end and a second end opposite the first end; and
- a utility raceway positioned in either a first space defined between the first wall of the commercial cargo body and the first end of the set of floor planks or a second space defined between the second wall of the commercial cargo body and the second end of the set of floor planks, the utility raceway defining an interior utility cavity with a top side;
- wherein, when the floor assembly is in the fully constructed state with the set of floor planks in place, the top side of the utility raceway is operable to open to provide access to the interior utility cavity and close to seal the interior utility cavity from the environment outside the interior utility cavity.

10. The floor assembly of claim 9, wherein the set of floor planks consists entirely of interchangeable planks.

11. The floor assembly of claim 9, wherein the utility raceway is a first utility raceway and the floor assembly further comprises a second utility raceway positioned in the other of the first and second spaces that the first utility raceway is not positioned in.

12. The floor assembly of claim 9, wherein the utility raceway is interchangeably positionable between the first and second spaces.

13. The floor assembly of claim 9, wherein each plank of the set of floor planks includes a first shelf defined on a first lateral outer edge and a second shelf defined on a second lateral outer edge opposite the first lateral outer edge and wherein the first shelf of a first plank of the set of floor planks mates with the second shelf of a second plank of the set of floor planks.

14. The floor assembly of claim 9, wherein the top side of the utility raceway includes a door that is pivotable to allow access to the interior utility cavity of the utility raceway.

15. The floor assembly of claim 14, wherein the door extends parallel to a plane defined by a top surface of the set of floor planks.

16. A floor assembly for a commercial cargo body, the floor assembly comprising:
- a set of floor planks configured to span between first and second walls of the commercial cargo body, the set of floor planks defining a first end and a second end opposite the first end; and
- a utility raceway positioned in either a first space defined between the first wall of the commercial cargo body and the first end of the set of floor planks or a second space defined between the second wall of the commercial cargo body and the second end of the set of floor planks, the utility raceway defining an interior utility cavity with a top side;
- wherein, when the floor assembly is in the fully constructed state with the set of floor planks in place, the top side of the utility raceway is moveable between an open configuration, in which access to the interior utility cavity is permitted, and a closed configuration, in which the top side prevents water intrusion into the interior utility cavity.

* * * * *